United States Patent [19]

LeBel

[11] 4,208,393

[45] Jun. 17, 1980

[54] PURIFICATION PROCESS

[75] Inventor: Gratian LeBel, Tracy, Canada

[73] Assignees: Tioxide Group Limited, Cleveland, England

[21] Appl. No.: 942,335

[22] Filed: Sep. 14, 1978

[30] Foreign Application Priority Data

Sep. 16, 1977 [GB] United Kingdom ............... 38647/77

[51] Int. Cl.$^2$ ............................................. C01F 11/46
[52] U.S. Cl. .............................. 423/555; 423/DIG. 2
[58] Field of Search .................. 423/166, 555, DIG. 2

[56] References Cited

U.S. PATENT DOCUMENTS 3,375,066  3/1968  Murakami et al. .................. 423/166

FOREIGN PATENT DOCUMENTS 1485067  9/1977  United Kingdom .

*Primary Examiner*—O. R. Vertiz
*Assistant Examiner*—Wayne A. Langel
*Attorney, Agent, or Firm*—Schuyler, Birch, McKie & Beckett

[57] ABSTRACT

A process for the treatment of aqueous sulphuric acid solutions containing dissolved ferrous sulphate comprising forming such a solution containing from 140 to 220 grams/liter free sulphuric acid in a first zone; adjusting the pH value of the solution in this zone to one in the range 3 to 4 by the addition of finely-divided calcium carbonate thereby precipitating calcium sulphate; passing the slurry thus produced to a second zone; adding to the second zone an aqueous solution of sulphuric acid containing from 3 to 80 grams/liter of free sulphuric acid; adjusting the pH value of the mixture in the second zone to one in the range 3.5 to 6 by the addition of finely-divided calcium carbonate thereby precipitating calcium sulphate and thereafter recovering from the second zone calcium sulphate suitable for use in the manufacture of plasterboard.

12 Claims, No Drawings

PURIFICATION PROCESS

The present invention relates to a process for the production of calcium sulphate in the form of oxygen from an aqueous effluent containing free sulphuric acid and dissolved ferrous sulphate wherein the gypsum is in a form which is particularly suitable for use in the production of plaster and plasterboard. While, at the same time, purifying the effluent prior to its discharge into receiving waters.

Aqueous effluents containing free sulphuric acid and dissolved ferrour sulphate are produced by several industrial processes, for example by the so-called 'sulphate' process for the production of pigmentary titanium dioxide and by "pickling processes" for steel plate.

In the case of the 'sulphate' process for the production of titanium dioxide in pigmentary from the effluent is normally of two types. One type consists of a strong effluent which is mainly the liquid left when the hydrous titanium dioxide (from the thermal hydrolysis of the titanium sulphate solution) is removed, for example by means of Moore filters or other suitable filtration apparatus. This strong effluent normally contains between about 270 and 310 grams/liter of free sulphuric acid. The other type of effluent from the 'sulphate' process is a weak effluent derived primarily from the washing of the hydrous titanium dioxide on the Moore filters (or other filtration equipment, when used). This normally contains an amount of free sulphuric acid in the range 50 to 80 grams/liter. The two types of effluent do, of course, contain proportionately smaller amounts of dissolved ferrous sulphate.

The amount of ferrous sulphate, at least in effluent from the 'sulphate' process, will vary depending upon the type of iron-containing titaniferous material used as the starting material. For example, in the case of the strong effluent where ilmenite has been used the amount of ferrous sulphate will normally lie in the range 40 to 70 grams/liter and particularly in the range 50 to 60 grams/liter, when expressed as elemental Fe. Where the starting material is a 'slag' (derived from the electro-smelting of ilmenite and the subsequent removal of at least some of the iron) the amount of ferrous sulphate is normally in the range 15 to 35 grams/liter, again expressed as Fe. In the case of the weak effluent, the use of ilmenite will normally give solutions containing 2 to 15 grams/liter and particularly containing 5 to 9 grams/liter, expressed as Fe. The use of slag will normally give solutions containing 0.5 to 8, and particularly 1 to 4, grams/liter expressed as Fe.

Whereas the strong effluent, as such, or the strong effluent suitably diluted (but always to give an acid concentration substantially higher than that of the weak effluent or higher than the concentration of the combined strong and weak effluent streams) may be neutralised (and purified) by the addition of calcium carbonate to form gypsum which is in a form acceptable as a starting material for the manufacture of plasterboard; it has been found much more difficult to obtain gypsum suitable for the purpose from the weak effluent. Furthermore, it has not been found possible to treat the combined strong and weak effluent streams by a single stage treatment with calcium carbonate since the free acid content of the combined effluent is insufficient to produce gypsum of acceptable quality for use as a starting material for plasterboard manufacture.

In the production of plasterboard, gypsum is first converted into calcium sulphate hemihydrate. This is normally achieved by heating gypsum to a temperature in the range 150° C. to 160° C. and gypsum suitable for use as a starting material in the manufacture of plasterboard should be of such quality as to give rise, when converted to the hemihydrate, to a product having the following characteristics:

(a) a pH value of at least 5,
(b) a chloride content of less than 0.03% and
(c) a consistency (measured as set out below) of 76 ml/100 g., and preferably 75 ml/100 g., or less.

Another (but somewhat variable) test which may also provide an indication of the suitability of the gypsum as a starting material is the determination of the set time (measured as set out below). The set time should normally fall within the range 30 to 60 minutes and preferably in the range 30 to 40 minutes.

It is an object of the present invention to provide a process whereby at least the greater part of the effluent from the 'sulphate' process for the production of pigmentary $TiO_2$ may be treated to produce calium sulphate (as gypsum) which is suitable for use in the production of plasterboard while, at the same time, purifying the effluent prior to its discharge into receiving waters.

Accordingly, the present invention is a process for the treatment of aqueous sulphuric acid solutions containing dissolved ferrous sulphate, comprising forming such a solution containing from 140 to 220 grams/liter free sulphuric acid in a first zone; adjusting the pH value of the solution in this zone to one in the range 3 to 4 by the addition of finely divided calcium carbonate thereby precipitating calcium sulphate; passing the slurry thus produced to a second zone; adding to the second zone an aqueous solution of sulphuric acid containing from 3 to 80 grams/liter of free sulphuric acid; adjusting the pH value of the mixture in the second zone to one in the range 3.5 by 6 by the addition of finely divided calcium carbonate thereby precipitating calcium sulphate and thereafter recovering from the second zone calcium sulphate suitable for use in the manufacture of plasterboard.

The aqueous acid which is treated in the first zone of the process preferably consists of the strong acid effluent from the 'sulphate' process. Normally the free acid content will be such that relatively little adjustment of the acid concentration in the first zone prior to treatment with calcium carbonate will be required. However, if the effluent contains a concentration of free sulphuric acid substantially greater than 200 grams/liter it is necessary to dilute this effluent, for example with an appropriate amount of weaker acidic effluent. Preferably, the concentration of free sulphuric acid in the first zone (prior to the addition of calcium carbonate) is adjusted to one in the range 160 to 200 grams/liter of solution.

Once the desired concentration of free acid is established in the first zone, the pH value of the solution is adjusted by the addition of finely divided calcium carbonate to one in the range 3 to 4 and preferably to one in the range 3.2 to 3.8.

The finely divided calcium carbonate is suitably added as an aqueous slurry, for example at a concentration in the range 30% to 50%, particularly at about 40%, by weight of calcium carbonate. The calcium carbonate is conveniently in the form of an aqueous slurry of crushed limestone, for example having a particle size such that at least 98% will pass through a 325 mesh British Standard Sieve although, of course, particles of different sizes are quite acceptable.

The mixture is normally stirred sufficiently vigorously to ensure very rapid mixing of the liquid and solid. For convenience, one reactant may be added to the lower part of the reactor and the other to the upper part of the reactor, particularly when the additions are carried out continuously over a prolonged period of time.

The reaction time of the reactants in the first zone is preferably at least 40 minutes and where the process is carried out continuously the first zone should, of course, be of sufficient volume to ensure the desired retention time for the reactants.

When the retention period is complete the resulting slurry of calcium sulphate is passed to the second zone, either continuously or intermittently, and more calcium carbonate and aqueous sulphuric acid containing ferrous sulphate are added to this zone. The method of adding reactants to the second zone may be similar to that in the first zone.

The effluent added to the second zone is normally the weak effluent from the 'sulphate' process for the production of pigmentary titanium dioxide, as previously described. The free sulphuric acid content of the liquid added should be in the range 3 to 80 grams/liter. Sufficient calcium carbonate and effluent are added to the second zone to provide a pH value in the range 3.5 to 6 and preferably one in the range 4 to 5. A sufficiently long retention time in the second zone is provided for the reaction with the calcium carbonate to proceed to completion, for example one of at least 25 minutes.

The temperature at which the calcium carbonate and effluent are mixed and maintained in both zones is normally in excess of 50° C. and is preferably in the range 55° C. to 75° C.

It appears that whereas the 'neutralisation' of the weak acid effluent as a separate step does not produce a high proportion of gypsum in a form which is suitable for use in plasterboard manufacture, the 'neutralisation' of such a weak acidic effluent in the presence of solid calcium sulphate formed by the 'neutralisation' of the strongly acidic effluent, greatly increases the proportion of gypsum which is suitable for use in plasterboard manufacture which is obtained from the weaker acidic effluent.

The gypsum recovered from the second zone is preferably treated to remove 'fines' before being washed and dewatered, for example by filtration or by the use of a centrifuge to a solids content in the range of about 70% to 92% and preferably to one in the range 80% to 90% by weight. One suitable method for removing 'fines' is by setting or 'thickening' followed by removal of the supernatant liquid containing the 'fines'. Another method is by the use of hydrocyclones. The washing of the solid material is normally carried out on the dewatering filter.

The washed and dewashed solids are then calcined to form calcium sulpate hemihydrate, as previously noted, to provide a material having physical characteristics which make the material very suitable as a starting material for use in the normal processes for the manufacture of plasterboard.

The mother liquor from the precipitated calcium sulfate in the second zone contains only a minor proportion of the impurities present in the original effluent, in particular the liquid is substantially free from sulphuric acid and metallic impurities other than iron and it can therefore be discharged into receiving waters without detriment to the latter. If desired, however, the pH value of the mother liquor can be increased, for example to one in the range 7 to 9, either by aeration or by the addition of an alkali such as lime, thereby precipitating substantially all the impurities remaining in the liquor. Such precipitated solids can then be dumped, either with or without calcination, since they represent only a small proportion of the original impurities and are in a substantially innocous form, particularly after calcination which gives a dry, friable product, which is very suitable for disposing on land.

When testing the gypsum produced by the foregoing process for suitability as a raw material in the manufacture of plasterboard i.e. to measure the consistency and, if desired, set time of the calcium sulphate hemihydrate produced therefrom it is desirable to carry out the preliminary calcination (to produce the hemihydrate) under controlled conditions and the subsequent tests for consistency and set time are carried out under the conditions set out below. These conditions are as follows:

(a) Calcination

A 600 g sample of ground gypsum (for example hammer milled) is placed in a stainless steel beaker and is stirred throughout the process. The beaker is heated by means of a flame in such a manner that the heating process, the end point of which is set out below, takes between 30 and 40 minutes.

During heating, when the temperature of the contents of the beaker reaches 120° C. and 135° C., the contents 'boil' and the volume increases. The boiling then ceases and the volume contacts. At this stage the solid is removed from the beaker and is allowed to cool. If necessary the material, when cool, may be sieved through a 60 mesh screen.

The temperature of the material should not be allowed to exceed 150° C. during the calcination process.

(b) Consistency test

This test determines the amount of water required for 100 g of calcium sulphate hemihydrate (obtained as in (a) above) to reach an acceptable pouring consistency.

The hemihydrate (100 g) is introduced into a known quantity of distilled water and the mixture is allowed to soak for 60 seconds. The mixture is then well mixed (stirred 60-70 times in 30/40 seconds) with a spatula during a period of 30 to 40 seconds to give a uniform slurry. The slurry is then poured on to the centre of a transparent glass plate which rests upon a piece of white cardboard on which are printed two concentric circles of diameter 1 13/16" and 2 1/16" respectively. The glass plate is then moved (if necessary) until the centre of the blob of slurry coincides with the centre of the circles. If the circumference of the slurry lies within the smaller circle then repeat the experiment with more water. If, on the other hand, the circumference of the slurry overlaps the circumference of the outer circle, then repeat the experiment with a reduced amount of water.

The consistency is reported as that amount of water in this test which provides a slurry, the circumference of which lies between the circumferences of the smaller and the larger circles.

(c) Set time

Waxed paper cups having a capacity between about 178 ml and 268 ml are taken and the mixture to be tested is placed in the cup and the change in the temperature of the contents is followed by means of a temperature sensor attached to a chart recorder. The sensor may either by placed in the mixture (between ¼ to ½ of the distance from the bottom of the cup to the top of the mixture) or the sensor may be spring-loaded to ensure close contact with the outside of the bottom of the cup. The test is carried out in an environment maintained at a temperature of between 20° C. to 22° C. and materials used in the test are maintained at the temperature of the environment.

The mixture is prepared by mixing 100 g of the dry sample as previously described and the mixture, when introduced into the cup, should reach about ¾" below the top of the cup. The cup is then covered by a watch glass and the set time is the time in minutes from when the sample is mixed with water to the time when the maximum temperature rise in the mixture is recorded.

The following Example 1 shows one embodiment of the present invention whereas Example 2 describes a process not according to the present invention which produces gypsum which is not suitable as a starting material for the manufacture of plasterboard.

EXAMPLE 1

A strong acid effluent containing 160 g/liter of free sulphuric acid (and 38 g/liter of dissolved ferrous sulphate) was introduced continuously into a reactor (Reactor A) at a flow rate of 0.62 cu. meters/hour.

An aqueous slurry of finely-divided calcium carbonate (40% by weight) was also introduced into the same reactor at a point remote from the point of acid effluent introduction at a flow rate of 0.177 cu. meters/hour, thus giving a limestone to acid ratio of 0.96.

This reactor was of such size as to give a residence time within the reactor of 70 to 80 minutes; the average temperature within the reactor was 68° C. and the average pH value was 3.7.

The suspension of calcium sulphate in Reactor A was withdrawn from the base of this reactor and was introduced into the upper half of a second reactor (Reactor B) into the lower half of which was also introduced an aqueous suspension of limestone (40% by weight) and weak effluent containing 55 g/liter of free sulphuric and 5 g/liter of dissolved ferrous sulphate. The rates of introduction of the calcium carbonate slurry and the weak effluent were, respectively, 0.051 cu. meters/hour and 0.39 cu. meters/hour.

The ratio of weak acid (introduced into Reactor B) to that of the strong acid (introduced into Reactor A) was thus 0.63.

The volume of Reactor B was such that the average residence time of the reactants was 25 minutes; the average temperature in this reactor was 61° C. and the average pH value was 4.5. The limestone to acid ratio in this reactor was 1.01.

The calcium sulphate was recovered from Reactor B by means of filtration and the resulting filter cake was washed until its chloride content was less than 0.03%, the pH value was 5.4 and the solids content of the filter cake was 85.8%.

A portion of the material was calcined as described in this specification and the consistency and set time of the resulting calcium sulphate hemihydrate was determined, also as described in this specification.

The consistency was 75 ml/100 gm and the set time 40 minutes.

The hemihydrate was found to be very suitable for the production of plasterboard on a commercial scale.

EXAMPLE 2 (not according to the present invention)

An aqueous effluent containing 116 g/liter free sulphuric acid (and 27 g/liter ferrous sulphate) was supplied to the upper part of a reaction vessel at a flow rate of 0.55 cu. meters/hour and a 40% aqueous slurry of calcium carbonate was supplied to the lower half of the reactor at a flow rate of 0.117 cu. meters/hour.

The average temperature in the reaction vessel was 69° C. (it varied between 65° C. and 70° C.) and the volume of the vessel was such that the retention time of the reactants was 75 minutes. The pH value in the reactor was 4.5 ($\pm 0.3$). The limestone to acid ratio was 0.98.

Calcium sulphate (in the form gypsum) was recovered by filtration from the overflow from the reactor as an 85.2% solids cake and this was washed and calcined in the manner previously described in the specification.

After calcination the hemihydrate product had a set time of 50 minutes and a consistency of 79 ml/100 g. The final pH value was 5.8.

From the high consistency rating it was apparent that the product was unsuitable as a starting material for the production of plasterboard.

What is claimed is:

1. A process for the treatment of aqueous sulphuric acid solutions containing dissolved ferrous sulphate comprising forming such a solution containing from 140 to 220 grams/liter free sulphuric acid in a first zone; adjusting the pH value of the solution in this zone to one in the range 3 to 4 by the addition of finely-divided calcium carbonate thereby precipitating calcium sulphate; passing the slurry thus produced to a second zone; adding to the second zone an aqueous solution of sulphuric acid containing from 3 to 80 grams/liter of free sulphuric acid; adjusting the pH value of the mixture in the second zone to one in the range 3.5 to 6 by the addition of finely-divided calcium carbonate thereby precipitating calcium sulphate and thereafter recovering from the second zone calcium sulphate suitable for use in the manufacture of plasterboard.

2. A process as claimed in claim 1 wherein the temperature in both zones is in excess of 50° C.

3. A process as claimed in claim 2 wherein the temperature is in the range 55° C. to 75° C.

4. A process as claimed in claim 1 wherein the pH value of the motor liquor after the removal of calcium sulphate is raised to one in the range 7 to 9 to precipitate solids therefrom.

5. A process as claimed in claim 4 wherein the solids are calcined to give a dry product.

6. A process as claimed in claim 1 wherein the concentration of free sulphuric acid in the first zone is in the range 160 to 200 grams/liter.

7. A process as claimed in claim 1 wherein the pH value in the first zone is adjusted to one in the range 3.2 to 3.8.

8. A process as claimed in claim 1 wherein the finely-divided calcium carbonate is added as an aqueous slurry having a concentration in the range 30% to 50% by weight.

9. A process as claimed in claim 1 wherein one reactant in the first or second zones is added to the lower part of the reactor and the other is added to the upper part of the reactor.

10. A process as claimed in claim 1 wherein the retention time in the first zone is at least 40 minutes and in the second zone at least 25 minutes.

11. A process as claimed in claim 1 wherein the pH value in the second zone is adjusted to one in the range 4 to 5.

12. A process as claimed in claim 1 wherein the calcium sulphate recovered from the second zone is calcined to form calcium sulphate hemihydrate.

* * * * *